US012103188B2

United States Patent
Li et al.

(10) Patent No.: US 12,103,188 B2
(45) Date of Patent: Oct. 1, 2024

(54) ROBOT CONTROL METHOD, DEVICE, AND REMOTE CONTROL SYSTEM

(71) Applicant: JAKA ROBOTICS CO., LTD., Shanghai (CN)

(72) Inventors: Mingyang Li, Shanghai (CN); Jiapeng Wang, Shanghai (CN); Xiangyang Zhu, Shanghai (CN)

(73) Assignee: JAKA ROBOTICS CO., LTD., Shanghai (CN)

( * ) Notice: Subject to any disclaimer, the term of this patent is extended or adjusted under 35 U.S.C. 154(b) by 716 days.

(21) Appl. No.: 17/281,034

(22) PCT Filed: Sep. 18, 2019

(86) PCT No.: PCT/CN2019/106404
§ 371 (c)(1),
(2) Date: Mar. 29, 2021

(87) PCT Pub. No.: WO2020/063416
PCT Pub. Date: Apr. 2, 2020

(65) Prior Publication Data
US 2021/0347052 A1    Nov. 11, 2021

(30) Foreign Application Priority Data
Sep. 27, 2018 (CN) .......................... 201811135130.0

(51) Int. Cl.
*G05B 19/4155* (2006.01)
*B25J 9/16* (2006.01)

(52) U.S. Cl.
CPC ........ *B25J 9/1689* (2013.01); *G05B 19/4155* (2013.01); *G05B 2219/39371* (2013.01)

(58) Field of Classification Search
CPC .......................... B25J 9/1689; G05B 19/4155
(Continued)

(56) References Cited

U.S. PATENT DOCUMENTS 8,874,300 B2 * 10/2014 Allard ............... B60W 60/0051
701/28
2009/0157224 A1 * 6/2009 Blanc ..................... B25J 9/1674
700/250
(Continued)

FOREIGN PATENT DOCUMENTS

CN      203045733 U      7/2013
CN      103324178 A      9/2013
(Continued)

OTHER PUBLICATIONS

Information Technology (Primary), Textbook Compilation Group, State Administration of Taxation, 2016, pp. 85-86, 1st Edition, China Tax Press.
(Continued)

*Primary Examiner* — Peter D Nolan
*Assistant Examiner* — Lukr Huynh
(74) *Attorney, Agent, or Firm* — IP & T GROUP LLP

(57) ABSTRACT

A robot control method, a device, and a remote control system. A mobile terminal establishes connection to a robot by scanning a two-dimensional code and by a local area network. A remote monitoring and control center connects to the mobile terminal by a wide area network, and when the mobile terminal and the remote monitoring and control center send information to each other, the mobile terminal breaks off connection with the robot, thereby ensuring information transmission security. Operation instruction information from a user on an operation interface is acquired, the operation instruction information comprising a control parameter and an action execution parameter, and based on the set control parameter and the set action execution parameter, first control instruction information is generated, and sent to the robot by a wireless communications network, in order to cause the robot to execute a
(Continued)

corresponding action based on the first control instruction information.

12 Claims, 3 Drawing Sheets

(58) Field of Classification Search
USPC .......................................................... 700/245
See application file for complete search history.

(56) References Cited

U.S. PATENT DOCUMENTS

| | | | |
|---|---|---|---|
| 2014/0135991 | A1 | 5/2014 | Summer et al. |
| 2016/0121479 | A1* | 5/2016 | Lin ........................ B25J 9/0003 701/2 |
| 2018/0292827 | A1 | 10/2018 | Artes et al. |

FOREIGN PATENT DOCUMENTS

| | | | |
|---|---|---|---|
| CN | 104385277 | A | 3/2015 |
| CN | 105252533 | A * | 1/2016 |
| CN | 105573176 | A | 5/2016 |
| CN | 105743746 | A | 7/2016 |
| CN | 106044645 | A | 10/2016 |
| CN | 106612195 | A | 5/2017 |
| CN | 106985150 | A | 7/2017 |
| CN | 107053143 | A | 8/2017 |
| CN | 107562017 | A | 1/2018 |
| CN | 108170285 | A | 6/2018 |
| CN | 108235696 | A | 6/2018 |
| CN | 108602188 | A | 9/2018 |
| CN | 109035740 | A | 12/2018 |
| DE | 102015121666 | B3 | 5/2017 |
| WO | 2016015671 | A1 | 2/2016 |
| WO | 2017121457 | A1 | 7/2017 |

OTHER PUBLICATIONS

Office Action for the European Patent Application No. 19867550.6 issued by the European Patent Office on Oct. 22, 2021.
European Search Report for the European Patent Application No. 19867550.6 issued by the European Patent Office on Oct. 12, 2021.

* cited by examiner

ROBOT CONTROL METHOD, DEVICE, AND REMOTE CONTROL SYSTEM

CROSS-REFERENCE TO RELATED APPLICATIONS

This application is a national stage application of PCT/CN2019/106404 filed on Sep. 18, 2019, which claims the priority to Chinese Patent Application No. 201811135130.0, entitled "Robot Control Method, Device and Remote Control System", filed with the Chinese Patent Office on Sep. 27, 2018, the entire content of which is incorporated herein by reference.

TECHNICAL FIELD

The present disclosure pertains to the field of robot control technology, and particularly to a robot control method, device, and a remote control system.

BACKGROUND ART

At present, an operator can control a robot without being on-site, and the operator can realize remote teaching and remote program running through a wide area network. However, this control mode has security problems and cannot ensure a secure connection between the control terminal and the robot.

Besides, under the control of the control terminal, the robot can perform few actions, which cannot meet the needs of users.

SUMMARY

The present disclosure provides a robot control method, applicable to a mobile terminal, which establishes connection with a robot via a local area network by scanning the two-dimensional code of the robot, the method comprising following steps of:
  acquiring operation instruction information from a user on an operation interface, wherein the operation instruction information contains a control parameter and an action execution parameter;
  setting the control parameter and the action execution parameter;
  generating first control instruction information according to the set control parameter and the set action execution parameter; and
  sending the first control instruction information to the robot via a wireless communication network, such that the robot executes a corresponding action according to the first control instruction information.

Optionally, the setting the control parameter and the action execution parameter includes:
  obtaining the number of an action cycle, starting conditions of the action cycle, and termination conditions of the action cycle according to the control parameter; and
  setting the number of an action cycle, the starting conditions of the action cycle, and the termination conditions of the action cycle;
  or
  obtaining the tray type, the interval between points corresponding to the tray type, information about respective points corresponding to the tray type, and anchor point position information according to the control parameter; and
  setting the interval between points corresponding to the tray type, information about respective points corresponding to the tray type, and the anchor point position information,
  wherein the tray type includes a straight line, a square, and a cube.

Optionally, the setting the control parameter and the action execution parameter includes:
  obtaining a rectilinear motion parameter, a joint motion parameter, and a way point parameter according to the action execution parameter; and
  setting the rectilinear motion parameter, the joint motion parameter, and the way point parameter,
  wherein the rectilinear motion parameter includes first name information, first velocity information, and current position information about the robot movement, the joint motion parameter includes position information about the arm joint movement of the robot, and the way point parameter includes information about the movement of the robot arm to respective positions.

Optionally, the operation instruction information further contains second control instruction information, and the method further comprises following step of:
  controlling the opening and the closing of the control cabinet of the robot according to the second control instruction information.

Optionally, the mobile terminal includes one or more selected from a smartphone, a tablet computer, and a personal digital assistant FDA.

Optionally, the method further comprises following steps of:
  acquiring the working information of the robot; and
  sending the working information via a wide area network to a remote monitoring center.

Optionally, the sending the working information via a wide area network to a remote monitoring center includes:
  interrupting the local area network connection with the robot;
  establishing connection with the remote monitoring center via the wide area network, and sending the working information to the remote monitoring center; and
  reestablishing the local area network connection with the robot after the information has been sent.

Optionally, the method further comprises following steps of;
  receiving a control strategy sent by the remote monitoring center via the wide area network; and
  generating first control instruction information for controlling the robot according to the control strategy.

The present disclosure provides a robot control method, applicable to a robot, the method comprising following steps of:
  receiving first control instruction information or second control instruction information sent by a mobile terminal via a wireless communication network; and
  executing a corresponding action according to the first control instruction information or the second control instruction information.

Optionally, the wireless communication network includes one or more selected from 2G network, 3G network, 4G network, ZigBee, Wireless Fidelity Wi-Fi Network, Bluetooth, 433M network, and 2.4G network.

The present disclosure provides a robot control device, applicable to a mobile terminal, the device comprising:
  an acquiring module for acquiring operation instruction information from a user on an operation interface, wherein the operation instruction information contains a control parameter and an action execution parameter;

a setting module for setting the control parameter and the action execution parameter;

a generating module for generating first control instruction information according to the set control parameter and the set action execution parameter; and a sending module for sending the first control instruction information to the robot via a wireless communication network, such that the robot executes a corresponding action according to the first control instruction information.

Optionally, the device further comprises:

an information reporting module, configured to acquire the working information of the robot and send the working information via a wide area network to a remote monitoring center.

Optionally, the information reporting module is specifically configured to:

interrupt the local area network connection with the robot; establish connection with the remote monitoring center via the wide area network, and sending the working information to the remote monitoring center; and reestablish the local area network connection with the robot after the information has been sent.

The present disclosure provides a robot control device, applicable to a robot, the device comprising:

a receiving module for receiving first control instruction information or second control instruction information sent by a mobile terminal via a wireless communication network; and an executive module for executing a corresponding action according to the first control instruction information or the second control instruction information.

The present disclosure provides a robot remote control system, comprising a mobile terminal including the robot control device according to an embodiment, a robot including the robot control device according to another embodiment, and a remote monitoring center, wherein the remote monitoring center is in connection with the mobile terminal in the control device via a wide area network, and the mobile terminal is disconnected from the robot in a situation where information is sent between the mobile terminal and the remote monitoring center.

The embodiments of the present disclosure provide a robot control method, a device, and a remote control system, wherein a mobile terminal establishes connection with a robot via a local area network by scanning the two-dimensional code of the robot, a remote monitoring center is in connection with the mobile terminal via a wide area network, and the mobile terminal is disconnected from the robot in a situation where information is sent between the mobile terminal and the remote monitoring center, hereby ensuring the security of the transmitted information; the mobile terminal acquires operation instruction information from a user on an operation interface, generates first control instruction information according to the operation instruction information, and sends the same to the robot via a wireless communication network, such that the robot executes a corresponding action according to the first control instruction information, wherein the operations of the robot are controlled through various application programs, which greatly meets the needs of users; and different factories are in connection with the remote monitoring center via the wide area network, hereby realizing sharing and monitoring of working information, and improving the production efficiency.

Other features and advantages of the present disclosure will be described in the subsequent description, and a part thereof becomes evident from the description or would be understood by implementing the present disclosure. The objects and other advantages of the present disclosure will be realized and obtained through a structure specifically indicated in the description, in the claims and in the drawings.

In order to make the above-mentioned objects, features and advantages of the present disclosure more evident and easier to understand, preferred embodiments will be specifically enumerated below and described in detail with reference to the accompanying drawings as follows.

BRIEF DESCRIPTION OF THE DRAWINGS

In order to more clearly describe the technical solutions of the specific embodiments of the present disclosure or in the prior art, the figures required to be used in the description of the specific embodiments or the prior art will be simply presented below. Clearly, the figures described below show certain embodiments of the present disclosure, and for a person ordinarily skilled in the art, other figures could be obtained according to these figures without inventive efforts.

Reference signs: 10—acquiring module; 20—setting module; 30—generating module; 40—sending module; 50—receiving module; and 60—executive module.

DETAILED DESCRIPTION OF THE EMBODIMENTS

In order to make the objects, the technical solutions, and the advantages of the embodiments of the present disclosure clearer, the technical solutions of the present disclosure will be clearly and comprehensively described below with reference to the accompanying drawings. Clearly, the described embodiments are merely some of the embodiments of the present disclosure, but not all the embodiments, Any other embodiments, obtained by a person ordinarily skilled in the art without inventive efforts based on the embodiments in the present disclosure, shall fall within the scope of protection of the present disclosure.

In order to facilitate the understanding of the present embodiment, the embodiment of the present disclosure will be introduced in the following contents in detail.

Figure 1:
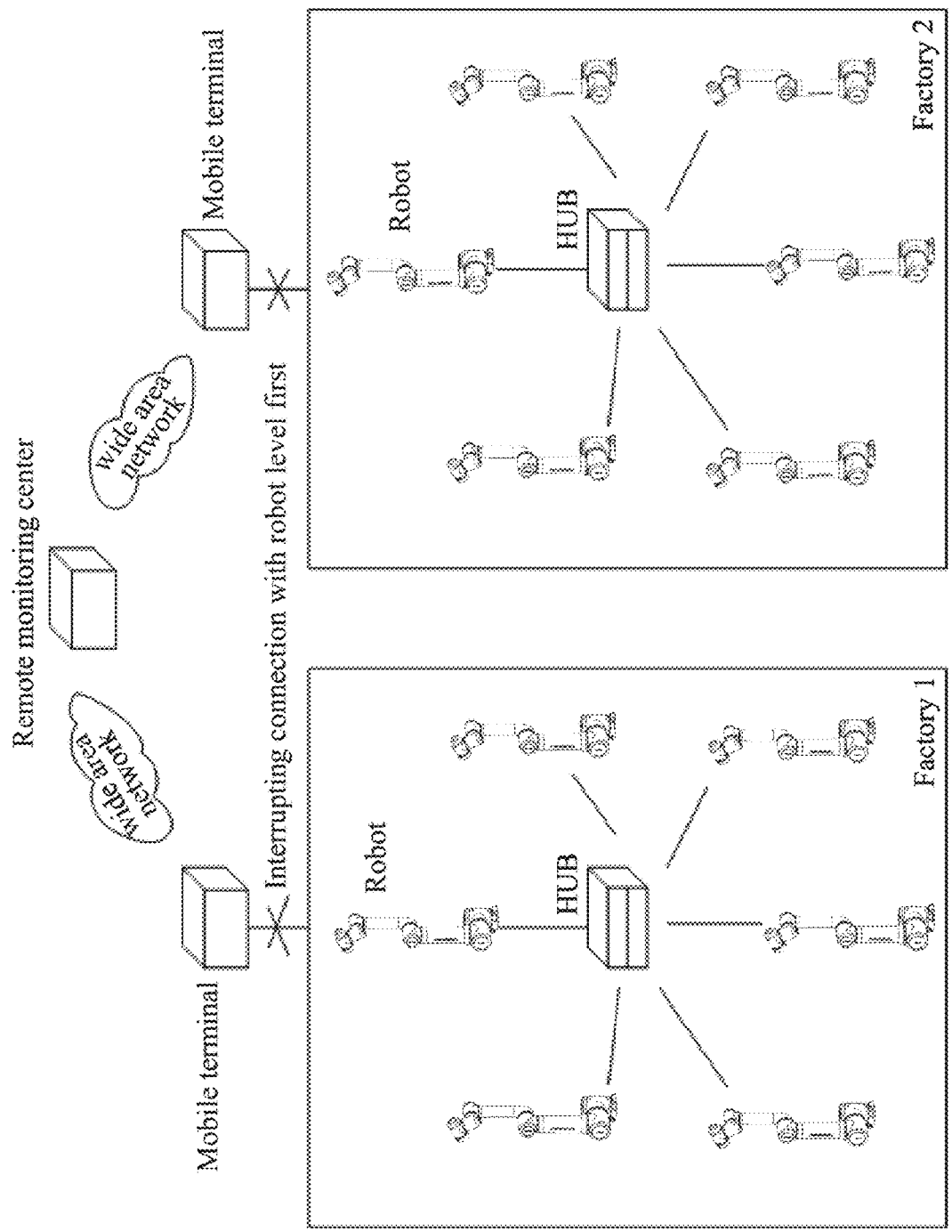
FIG. 1 is a schematic diagram showing an application scenario of a robot remote control system provided in an embodiment of the present disclosure.

FIG. 1 is a schematic diagram showing an application scenario of a robot remote control system provided in the present embodiment.

Referring to FIG. 1, the remote control system can comprise a control device and a remote monitoring center. The control device can include a plurality of mobile terminals and a plurality of robots, and in respective factories, each mobile terminal can be in connection with a plurality of robots, and the mobile terminal is then in connection with the remote monitoring center.

In this context, the mobile terminal may be a cellphone, and the robot can be controlled via APP (Application) in the cellphone.

In the factory, the mobile terminal is in connection with a plurality of robots, but at a certain moment, the mobile terminal can only be in connection with one robot, and can establish connection with other robots only after being disconnected from this robot.

The connection between the mobile terminal and the robot is realized via a local area network, the body of each robot is provided with a unique two-dimensional code, and the mobile terminal establishes connection with the robot by scanning the two-dimensional code through the camera thereon, hereby improving the security. In the above, the two-dimensional code may be a packed IP address.

When information is sent between the mobile terminal and the remote monitoring center, the mobile terminal is disconnected from the robot, and the connection with the robot is reestablished after that the information is sent, wherein the mobile terminal and the remote monitoring center are in connection with each other via a wide area network, and a layered architecture is adopted in the present disclosure, which ensures the security of the connection. Different factories are in connection with the remote monitoring center via the wide area network, hereby realizing sharing and monitoring of working information, and improving the production efficiency.

Figure 2:
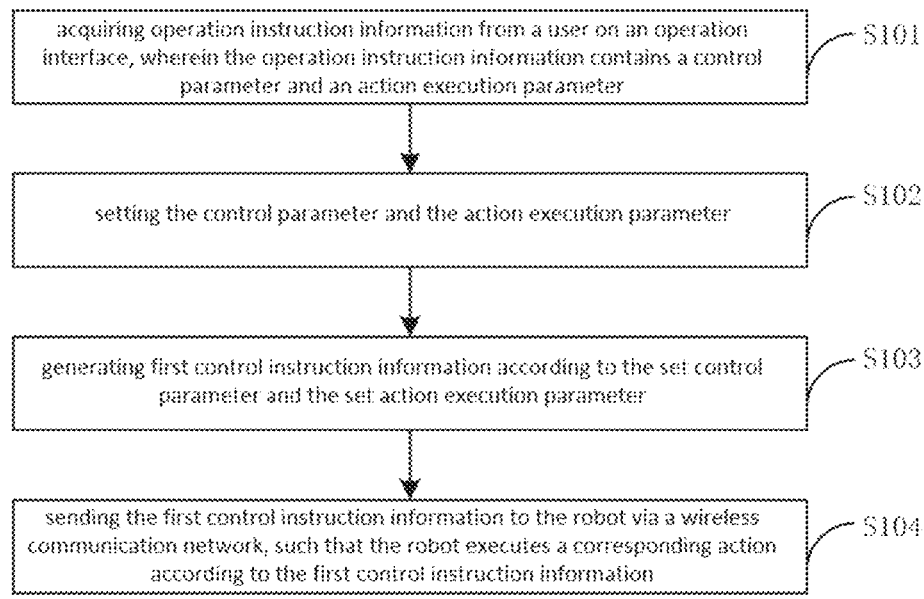
FIG. 2 shows a flow chart of a robot control method provided in an embodiment of the present disclosure.

FIG. 2 shows a flow chart of a robot control method for application to a mobile terminal provided in the present embodiment, wherein the mobile terminal can establish connection with a robot via a local area network by scanning the two-dimensional code of the robot, and the method comprises following steps:

Step S101: acquiring operation instruction information from a user on an operation interface, wherein the operation instruction information contains a control parameter and an action execution parameter;

Step S102: setting the control parameter and the action execution parameter;

Step S103: generating first control instruction information according to the set control parameter and the set action execution parameter; and Step S104: sending the first control instruction information to the robot via a wireless communication network, such that the robot executes a corresponding action according to the first control instruction information.

On the basis of the above steps, the robot control method provided in the present embodiment enables a user to establish a local area network connection with a robot by way of scanning a code with a mobile terminal and to configure the action to be executed by the robot via the local area network, in this way, a secure connection between the mobile terminal and the robot can be ensured.

Specifically, the work task flow of the user can further be realized on the mobile terminal through graphical programming and drag-and-drop programming, and the user experience is improved.

Optionally, step S102 includes following steps:

Step S201: obtaining the number of an action cycle, starting conditions of the action cycle, and termination conditions of the action cycle according to the control parameter; and Step S202: setting the number of the action cycle, the starting conditions of the action cycle, and the termination conditions of the action cycle;

or

Step S301: obtaining the tray type, the interval between points corresponding to the tray type, information about respective points corresponding to the tray type, and anchor point position information according to the control parameter; and Step S302: setting the interval between points corresponding to the tray type, information about respective points corresponding to the tray type, and the anchor point position information, wherein the tray type includes a straight line, a square, and a cube.

Specifically, when the tray type indicates a straight line, the straight line includes a starting point and an ending point, the interval between the starting point and the ending point can be set to 5 s, and the anchor point position information can be set.

When the tray type indicates a square, the square includes corner point 1, corner point 2, corner point 3, and corner point 4, the interval from corner point 1 to corner point 2 can be set to 5 s, the interval from corner point 2 to corner point 3 can be set to 5 s, and the anchor point position information can be set.

When the tray type indicates a cube, the cube includes corner point 1, corner point 2, corner point 3, corner point 4, corner point 5, corner point 6, corner point 7, and corner point 8, the interval from corner point 1 to corner point 2 can be set to 5 s, the interval from corner point 2 to corner point 3 can be set to 5 s, the interval from corner point 1 to corner point 5 can be set to 5 s, and the anchor point position information can be set.

The robot arm moves relative to the position of the tray, such that the robot arm is located at the anchor point position. The setting of the tray parameters can make the robot execute the same motion and action sequence in several different positions.

Optionally, step S102 includes following steps:

Step S401: obtaining a rectilinear motion parameter, a joint motion parameter, and a way point parameter according to the action execution parameter; and Step S402: setting the rectilinear motion parameter, the joint motion parameter, and the way point parameter, wherein the rectilinear motion parameter includes first name information, first velocity information, and current position information about the robot movement, the joint motion parameter includes position information about the arm joint movement of the robot, and the way point parameter includes information about the movement of the robot arm to respective positions.

In the context, the joint motion parameter may be position information about the movement of the arm joint part of the robot, and the mobile terminal can control each joint to move to a desired key position.

The way point parameter may be a point on the path of the robot, indicating where the robot arm moves.

Optionally, the operation instruction information further contains second control instruction information, and the method further comprises:

Step S501: controlling the opening and the closing of the control cabinet of the robot according to the second control instruction information.

Optionally, the mobile terminal includes one or more selected from a smartphone, a tablet computer, and a PDA (Personal Digital Assistant).

Optionally, in the present embodiment, the mobile terminal can also acquire the working information of the robot and send the working information via the wide area network to the remote monitoring center. In this way, the working information of robots in different factories can be collected in the remote monitoring center for unified monitoring and management.

Optionally, in the present embodiment, when the mobile terminal sends the working information to the remote monitoring center via the wide area network, the local area network connection between the mobile terminal and the robot is firstly interrupted, then connection with the remote monitoring center is established via the wide area network, and the working information is sent to the remote monitoring center. When the information is completely sent, the local area network connection with the robot is reestablished. In this way, the robot-level local area network would not communicate with the wide area network, and the security of the robot-level local area network can be improved accordingly.

Optionally, in the present embodiment, the mobile terminal can also receive a control strategy sent by the remote monitoring center via the wide area network, and generates first control instruction information for controlling the robot according to the control strategy. In this way, the control strategy can be issued from the remote monitoring center to the robot via the mobile terminal, such that the robot executes a corresponding action, hereby realizing centralized control over the robots in different factories through the remote monitoring center.

Figure 3:
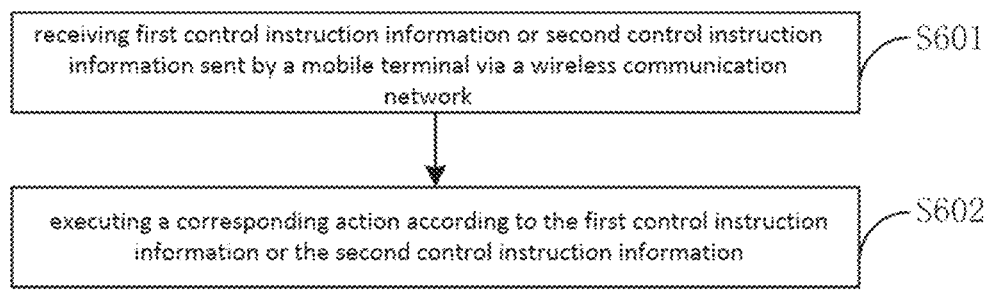
FIG. 3 shows a flow chart of another robot control method provided in an embodiment of the present disclosure.

FIG. 3 shows a flow chart of a control method for application to a robot provided in the present embodiment, the method comprising following steps:

Step S601: receiving first control instruction information or second control instruction information sent by a mobile terminal via a wireless communication network; and Step S602: executing a corresponding action according to the first control instruction information or the second control instruction information.

In the context, the second control instruction information is instruction information for controlling the opening and the closing of the control cabinet of the robot.

Optionally, the wireless communication network includes one or more selected from 2G network, 3G network, 4G network, ZigBee, Wireless Fidelity Wi-Fi Network, Bluetooth, 433M network, and 2.4G network.

Figure 4:
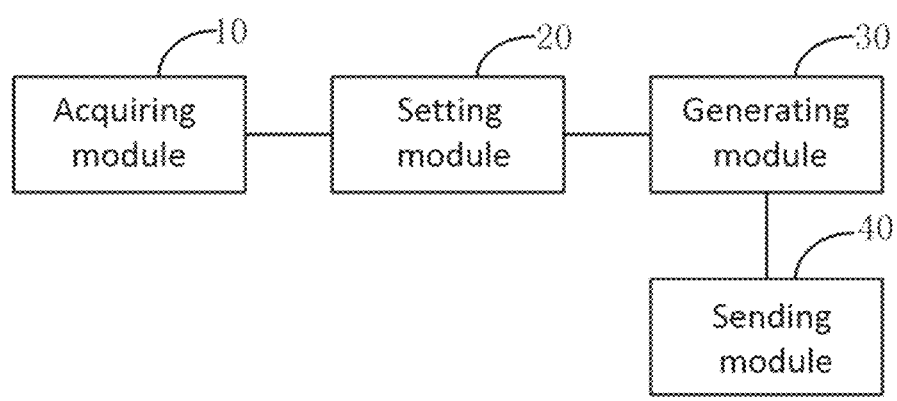
FIG. 4 shows a schematic diagram of a robot control device provided in an embodiment of the present disclosure.

FIG. 4 shows a schematic diagram of a robot control device for application to a mobile terminal provided in the present embodiment, this device comprising an acquiring module 10, a setting module 20, a generating module 30, and a sending module 40.

The acquiring module 10 is configured to acquire operation instruction information from a user on an operation interface, wherein the operation instruction information contains a control parameter and an action execution parameter.

The setting module 20 is configured to set the control parameter and the action execution parameter.

The generating module 30 is configured to generate first control instruction information according to the set control parameter and the set action execution parameter.

The sending module 40 is configured to send the first control instruction information to the robot via a wireless communication network, such that the robot executes a corresponding action according to the first control instruction information.

Optionally, in the present embodiment, the device further comprises an information reporting module.

The information reporting module is configured to acquire the working information of the robot and send the working information via a wide area network to a remote monitoring center.

Optionally, in the present embodiment, the information reporting module is specifically configured to interrupt the local area network connection with the robot; establish connection with the remote monitoring center via the wide area network, and send the working information to the remote monitoring center; and reestablish the local area network connection with the robot after information has been sent.

Figure 5:
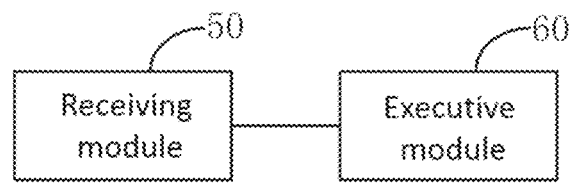
FIG. 5 shows a schematic diagram of another robot control device provided in an embodiment of the present disclosure.

FIG. 5 shows a schematic diagram of a control device for application to a robot provided in the present embodiment, the device comprising a receiving module 50 and an executive module 60.

The receiving module 50 is configured to receive first control instruction information or second control instruction information sent by a mobile terminal via a wireless communication network.

The executive module 60 is configured to execute a corresponding action according to the first control instruction information or the second control instruction information.

A robot remote control system comprises a robot remote control device as described above, and further comprises a remote monitoring center, wherein the remote monitoring center is in connection with a mobile terminal in the remote control device via a wide area network, and the mobile terminal is disconnected from the robot in a situation where information is sent between the mobile terminal and the remote monitoring center.

The present embodiment provides a robot control method, a device, and a remote control system, wherein a mobile terminal establishes connection with a robot via a local area network by scanning the two-dimensional code of the robot, a remote monitoring center is in connection with the mobile terminal via a wide area network, and the mobile terminal is disconnected from the robot in a situation where information is sent between the mobile terminal and the remote monitoring center, hereby ensuring the security of the transmitted information; the mobile terminal acquires operation instruction information from a user on an operation interface, generates first control instruction information according to the operation instruction information, and sends the same to the robot via a wireless communication network, such that the robot executes a corresponding action according to the first control instruction information, wherein the operations of the robot are controlled through various application programs, which greatly meets the needs of users; and different factories are in connection with the remote monitoring center via the wide area network, hereby realizing sharing and monitoring of working information, and improving the production efficiency.

The present embodiment further provides an electronic apparatus, comprising a memory, a processor, and a computer program stored in the memory and runnable in the processor, wherein the steps of the robot control method provided in the above embodiment are implemented, when the processor executes the computer program.

The present embodiment further provides a computer readable storage medium, in which a computer program is stored, wherein the computer program executes the steps of the robot control method provided in the above embodiment when being run by the processor.

A computer program product provided in the present embodiment includes a computer readable storage medium in which program codes are stored. An instruction contained in the program codes can be used to execute the method according to the preceding method embodiment. As to specific implementation, reference can be made to the method embodiment, and no repetitive description will be made here.

It could be clearly understood for a person skilled in the art that for convenience and conciseness of the description, as to the specific working process of the system and the device as mentioned above, reference can be made to the corresponding processes in the preceding method embodiment, and no repetitive description will be made here.

Besides, in the description of the present embodiment, unless otherwise expressly specified and defined, terms such as "mount", "link", and "connect" shall be construed in a broad sense. For example, it may be fixed connection, or detachable connection, or integrated connection; it may be mechanical connection, or electrical connection; or it may be direct connection, or indirect connection via an intermediate, or inner communication between two elements. For a person ordinarily skilled in the art, the specific meanings of the above-mentioned terms in the present disclosure could be construed in accordance with specific circumstances.

If the function is implemented in a form of a software functional unit and is sold or used as an independent product, the function can be stored in one computer readable storage medium. On the basis of such understanding, the technical solution of the present disclosure essentially or a part contributive to the prior art, or a part thereof can be embodied in a form of a software product, and the computer software product is stored in one storage medium, including several instructions to enable a computer apparatus (which may be a personal computer, a server, or a network apparatus or the like) to execute all or partial steps of the method described in the respective embodiments of the present disclosure. Moreover, the preceding storage medium includes various media being capable of storing program codes, such as USB flash disk, mobile hard disk, Read-Only Memory (ROM), Random Access Memory (RAM), a disk or an optical disk.

In the description of the present disclosure, it is to be clarified that orientations or position relationships indicated by terms such as "central", "upper", "lower", "left", "right", "vertical", "horizontal", "inner", and "outer" are orientations or position relationships based on the drawings, merely for the purpose of facilitating the description of the present disclosure and for simplifying the description, rather than indicating or implying that a specified device or element must have a specific orientation, and be constructed and operated in a certain orientation, and therefore cannot be construed as limiting the present disclosure. In addition, terms such as "first", "second", and "third" are used merely for purpose of description, and cannot be construed as indicating or implying to have importance in relativity.

At last, it is to be clarified that the above embodiments are merely specific examples of the present disclosure, and are used to explain the technical solutions of the present disclosure, rather than limiting the same, thus, the scope of protection of the present disclosure is not limited thereto. Although the present disclosure is explained in detail referring to the preceding embodiments, it should be understood for a person ordinarily skilled in the art that any technical person familiar with the present technical field can still readily make modifications or variations to the technical solutions recorded in the preceding embodiments, or substitute a part of the technical features with equivalent, within the technical scope disclosed in the present disclosure. However, these modifications, variations or substitutions do not make the essence of the respective technical solutions depart from the spirit and scope of the technical solutions of the embodiments of the present disclosure, and shall all be covered by the scope of protection of the present disclosure. Thus, the scope of protection of the present disclosure shall be defined according to the scope claimed by the claims.

INDUSTRIAL APPLICABILITY

The embodiments of the present disclosure provide a robot control method, a device, and a remote control system, wherein a mobile terminal establishes connection with a robot via a local area network by scanning the two-dimensional code of the robot, a remote monitoring center is in connection with the mobile terminal via a wide area network, and the mobile terminal is disconnected from the robot in a situation where information is sent between the mobile terminal and the remote monitoring center, hereby ensuring the security of the transmitted information; the mobile terminal acquires operation instruction information from a user on an operation interface, generates first control instruction information according to the operation instruction information, and sends the same to the robot via a wireless communication network, such that the robot executes a corresponding action according to the first control instruction information, wherein the operations of the robot are controlled through various application programs, which greatly meets the needs of users; and different factories are in connection with the remote monitoring center via the wide area network, hereby realizing sharing and monitoring of working information, and improving the production efficiency.

The invention claimed is:

1. A robot control method, wherein the robot control method is applicable to a mobile terminal, wherein the mobile terminal establishes connection with a robot via a local area network by scanning a two-dimensional code of the robot, wherein the method comprises following steps of:
    acquiring operation instruction information from a user on an operation interface, wherein the operation instruction information comprises a control parameter and an action execution parameter;
    setting the control parameter and the action execution parameter;
    generating first control instruction information according to a set control parameter and a set action execution parameter; and
    sending the first control instruction information to the robot via a wireless communication network, such that the robot executes a corresponding action according to the first control instruction information;
wherein the method further comprises following steps of:
acquiring working information of the robot; and
sending the working information via a wide area network to a remote monitoring center; and
wherein the sending the working information via a wide area network to a remote monitoring center comprises:
    interrupting a local area network connection with the robot;
    establishing connection with the remote monitoring center via the wide area network, and sending the working information to the remote monitoring center; and
    reestablishing the local area network connection with the robot after information has been sent.

2. The robot control method according to claim 1, wherein the setting the control parameter and the action execution parameter comprises:
  obtaining, according to the control parameter, a number of an action cycle, a starting condition of the action cycle, and a termination condition of the action cycle; and
  setting the number of the action cycle, the starting condition of the action cycle, and the termination condition of the action cycle;
  or
  obtaining, according to the control parameter, a tray type, an interval between points corresponding to the tray type, information about respective points corresponding to the tray type, and anchor point position information; and
  setting the interval between points corresponding to the tray type, the information about respective points corresponding to the tray type, and the anchor point position information, wherein the tray type comprises a straight line, a square and a cube.

3. The robot control method according to claim 2, wherein the setting the control parameter and the action execution parameter comprises:
  obtaining, according to the action execution parameter, a rectilinear motion parameter, a joint motion parameter, and a way point parameter; and
  setting the rectilinear motion parameter, the joint motion parameter, and the way point parameter,
  wherein the rectilinear motion parameter comprises first name information, first velocity information, and current position information about a movement of the robot, the joint motion parameter comprises position information about a movement of an arm joint of the robot, and the way point parameter comprises information about a movement of an arm of the robot to respective positions.

4. The robot control method according to claim 3, wherein the operation instruction information further comprises second control instruction information, and the method further comprises following step of:
  controlling an opening and a closing of a control cabinet of the robot according to the second control instruction information.

5. The robot control method according to claim 3, wherein the mobile terminal comprises one or more of a smartphone, a tablet computer, and a personal digital assistant PDA.

6. The robot control method according to claim 2, wherein the operation instruction information further comprises second control instruction information, and the method further comprises following step of:
  controlling an opening and a closing of a control cabinet of the robot according to the second control instruction information.

7. The robot control method according to claim 2, wherein the mobile terminal comprises one or more of a smartphone, a tablet computer, and a personal digital assistant PDA.

8. The robot control method according to claim 2, wherein the method further comprises following steps of:
  receiving a control strategy sent by a remote monitoring center via a wide area network; and
  generating the first control instruction information for controlling the robot according to the control strategy.

9. The robot control method according to claim 1, wherein the operation instruction information further comprises second control instruction information, and the method further comprises following step of:
  controlling an opening and a closing of a control cabinet of the robot according to the second control instruction information.

10. The robot control method according to claim 1, wherein the mobile terminal comprises one or more of a smartphone, a tablet computer, and a personal digital assistant PDA.

11. The robot control method according to claim 1, wherein the method further comprises following steps of:
  receiving a control strategy sent by a remote monitoring center via a wide area network; and
  generating the first control instruction information for controlling the robot according to the control strategy.

12. A robot control device, wherein the robot control device is applicable to a mobile terminal, wherein the device comprises:
  an acquiring module, configured to acquire operation instruction information from a user on an operation interface, wherein the operation instruction information comprises a control parameter and an action execution parameter;
  a setting module, configured to set the control parameter and the action execution parameter;
  a generating module, configured to generate first control instruction information according to a set control parameter and a set action execution parameter; and
  a sending module, configured to send the first control instruction information to the robot via a wireless communication network, such that the robot executes a corresponding action according to the first control instruction information;
  wherein the device further comprises:
  an information reporting module, configured to acquire working information of the robot and send the working information via a wide area network to a remote monitoring center; and
  wherein the information reporting module is configured to interrupt a local area network connection with the robot; establish connection with the remote monitoring center via the wide area network, and send the working information to the remote monitoring center; and reestablish the local area network connection with the robot after information has been sent.

* * * * *